United States Patent
Kwak et al.

(10) Patent No.: US 10,763,771 B2
(45) Date of Patent: Sep. 1, 2020

(54) METHOD AND SYSTEM FOR CONTROLLING MOTOR FOR VEHICLE

(71) Applicants: Hyundai Motor Company, Seoul (KR); Kia Motors Corporation, Seoul (KR)

(72) Inventors: Heon Young Kwak, Gyeonggi-do (KR); Chae Duck Chon, Gyeonggi-do (KR); Ho Joon Shin, Gyeonggi-do (KR)

(73) Assignees: Hyundai Motor Company, Seoul (KR); Kia Motors Corporation, Seoul (KR)

(*) Notice: Subject to any disclaimer, the term of this patent is extended or adjusted under 35 U.S.C. 154(b) by 8 days.

(21) Appl. No.: 16/154,986

(22) Filed: Oct. 9, 2018

(65) Prior Publication Data
US 2019/0190427 A1     Jun. 20, 2019

(30) Foreign Application Priority Data

Dec. 18, 2017   (KR) .......................... 10-2017-0174071

(51) Int. Cl.
*H02P 23/14*   (2006.01)
*B60K 6/26*    (2007.10)
*B60L 50/51*   (2019.01)

(52) U.S. Cl.
CPC ................ *H02P 23/14* (2013.01); *B60K 6/26* (2013.01); *B60L 50/51* (2019.02); *B60L 2210/44* (2013.01); *B60Y 2200/91* (2013.01); *B60Y 2200/92* (2013.01); *B60Y 2400/604* (2013.01); *B60Y 2400/61* (2013.01)

(58) Field of Classification Search
CPC . B60K 6/26; B60L 50/51; H02P 23/14; H02P 5/56; H02P 6/00; H02P 9/00; H02P 21/06; H02P 23/18
See application file for complete search history.

(56) References Cited

U.S. PATENT DOCUMENTS

| | | | |
|---|---|---|---|
| 2010/0052581 A1* | 3/2010 | Izumi ...................... | B60K 6/48 318/400.04 |
| 2014/0111130 A1* | 4/2014 | Yamada ................. | B60L 3/0038 318/400.32 |

FOREIGN PATENT DOCUMENTS

KR    10-2004-0066343 A    7/2004

* cited by examiner

*Primary Examiner* — Eduardo Colon Santana
*Assistant Examiner* — Said Bouziane
(74) *Attorney, Agent, or Firm* — Mintz Levin Cohn Ferris Glovsky and Popeo, P.C.; Peter F. Corless

(57) ABSTRACT

A method and a system for controlling a motor for a vehicle are provided. The vehicle is capable of being continuously driven by controlling the motor based on position information of a rotor derived using a sensorless estimation algorithm in the event of a failure of a position sensor of a motor rotor while the vehicle is being driven.

4 Claims, 5 Drawing Sheets

METHOD AND SYSTEM FOR CONTROLLING MOTOR FOR VEHICLE

CROSS REFERENCE TO RELATED APPLICATION

This application claims the benefit of Korean Patent Application No. 10-2017-0174071 filed on Dec. 18, 2017, entitled "Method and System for Controlling Motor for Vehicle", which is hereby incorporated by reference in its entirety into this application.

BACKGROUND

1. Technical Field

The present invention relates to a method and a system for controlling a motor for a vehicle, and more particularly, to a method and a system for controlling a motor for a vehicle capable of continuously driving the vehicle, by operating the motor based on position information of a rotor derived through a sensorless estimation algorithm in the event of a failure of a position sensor of a motor rotor while the vehicle is being driven.

2. Description of the Related Art

A motor, which is the main component that generates driving force of a vehicle in an environmentally friendly vehicle such as an electric vehicle (EV) and a plug-in hybrid electric vehicle (PHEV), is connected to an inverter and receives a three-phase current, thereby generating torque. The inverter adjusts the three-phase current to adjust the torque of the motor, and generally obtains the three-phase current and position information of a motor rotor for current control using a sensor.

The position sensor of the motor rotor is attached inside the motor and is connected to the inverter via an external signal wiring. When a wiring connector is not properly connected, disconnected or shorted, the position information of the rotor is distorted and a current of the motor is adjusted abnormally or incorrectly, which may result in unwanted driving force. Therefore, a fault logic for the position sensor of the rotor may be generally used to interrupt the current control of the inverter in the event of a failure or fault. However, the vehicle may not be operated according to the driver's intention when a problem occurs during driving of the vehicle and safety of the driver may not be guaranteed.

In other words, according to the related art, since the inverter stops the current control of the motor when the failure of the position sensor of the motor rotor is sensed, the HEV/PHEV having a separate power source may be driven in a limp home mode using only an engine by operating the engine, but the EV that does not have the separate power source is stopped since power is interrupted. As a result, when the above-mentioned problem occurs during driving of the vehicle, the vehicle may no longer be operated based on the driver's intention and the safety of the driver is not guaranteed. Therefore, a solution capable of operating the vehicle according to the driver's intention even when a failure of the position sensor of the rotor during driving of the vehicle occurs is required.

The matters described as the related art have been provided merely for assisting in the understanding for the background of the present invention and should not be considered as corresponding to the related art known to those skilled in the art.

SUMMARY

An object of the present invention is to provide a method and a system for controlling a motor for a vehicle capable of continuously driving the vehicle, by operating the motor based on position information of a rotor derived through a sensorless estimation algorithm in the event of a failure of a position sensor of a motor rotor during driving of the vehicle.

According to an exemplary embodiment of the present invention, a method for controlling a motor for a vehicle may include: determining whether a failure of a position sensor occurs by receiving first position information of a motor rotor which is output from a position sensor of the motor rotor; deriving second position information using a sensorless estimation algorithm which is previously provided and stored in response to determining that the fault of the position sensor occurs and switching the first position information into the second position information; and sensing a value of a direct current which is input to an inverter in the condition in which output torque of the motor is limited and compensating for error of the second position information based on the sensed value of the direct current.

In the switching of the first position information into the second position information, the second position information may be derived by applying third position information of the motor rotor and motor speed which are each output before the failure of the position sensor occurs to the sensorless estimation algorithm. The sensorless estimation algorithm may derive the second position information using the third position information as an initial value and integrating the motor speed. In the compensating of the error of the second position information, the value of the direct current which is input to the inverter may be sensed in the condition in which the output torque of the motor is limited to zero (0), and a compensation value may be derived based on the sensed value of the direct current.

According to another exemplary embodiment of the present invention, a method for controlling a motor for a vehicle may include: deriving second position information using a sensorless estimation algorithm previously provided and stored and storing the second position information; determining whether a failure of a position sensor occurs by receiving first position information of a motor rotor which is output from a position sensor of the motor rotor; switching the first position information into the stored second position information in response to determining that the failure of the position sensor occurs; and sensing a value of a direct current which is input to an inverter in the condition in which output torque of the motor is limited and compensating for error of the second position information based on the sensed value of the direct current. In the compensating of the error of the second position information, the value of the direct current which is input to the inverter may be sensed in the condition in which the output torque of the motor is limited to zero (0), and a compensation value may be derived based on the sensed value of the direct current.

According to another exemplary embodiment of the present invention, a system for controlling a motor for a vehicle may include: a motor configured to generate driving force of the vehicle; a position sensor of a motor rotor configured to output position information of the motor rotor; an inverter configured to convert a direct current (DC) into an alternating current (AC) and output the current to the motor; and a controller configured to determine whether a fault of the position sensor occurs by receiving first position information of the motor rotor which is output from the position sensor of the motor rotor, derive second position information through a sensorless estimation algorithm previously provided and stored in response to determining that the failure of the position sensor occurs, switch the first position information into the second position information, sense a value of the direct current which is input to the inverter in the condition in which output torque of the motor is limited, and compensate for error of the second position information based on the sensed value of the direct current.

The controller may be configured to derive the second position information by applying third position information of the motor rotor and motor speed which are each output before the failure of the position sensor occurs to the sensorless estimation algorithm. The sensorless estimation algorithm may derive the second position information using the third position information as an initial value and integrating the motor speed.

BRIEF DESCRIPTION OF THE DRAWINGS

The present disclosure will become more apparent by describing in detail exemplary embodiments of the present disclosure with reference to the accompanying drawings, in which.

DETAILED DESCRIPTION

Figure 1:
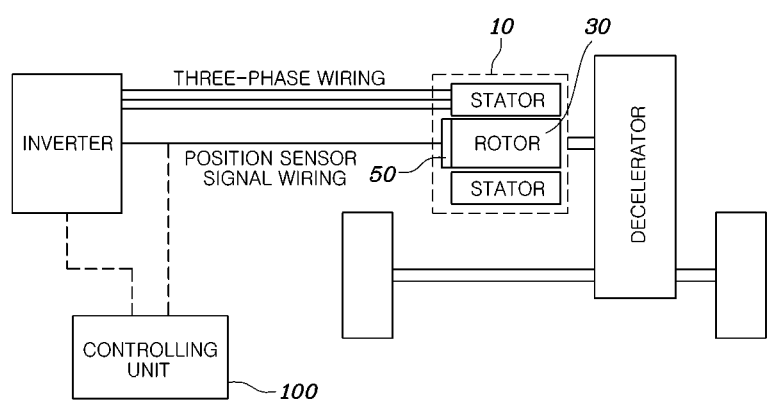
FIG. 1 is a configuration diagram of a system for controlling a motor for a vehicle according to an exemplary embodiment of the present invention.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

Although exemplary embodiment is described as using a plurality of units to perform the exemplary process, it is understood that the exemplary processes may also be performed by one or plurality of modules. Additionally, it is understood that the term controller/control unit refers to a hardware device that includes a memory and a processor. The memory is configured to store the modules and the processor is specifically configured to execute said modules to perform one or more processes which are described further below.

Furthermore, control logic of the present invention may be embodied as non-transitory computer readable media on a computer readable medium containing executable program instructions executed by a processor, controller/control unit or the like. Examples of the computer readable mediums include, but are not limited to, ROM, RAM, compact disc (CD)-ROMs, magnetic tapes, floppy disks, flash drives, smart cards and optical data storage devices. The computer readable recording medium can also be distributed in network coupled computer systems so that the computer readable media is stored and executed in a distributed fashion, e.g., by a telematics server or a Controller Area Network (CAN).

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about."

Hereinafter, a method and a system for controlling a motor for a vehicle according to various exemplary embodiments of the present invention will be described with reference to the accompanying drawings.

Figure 2:
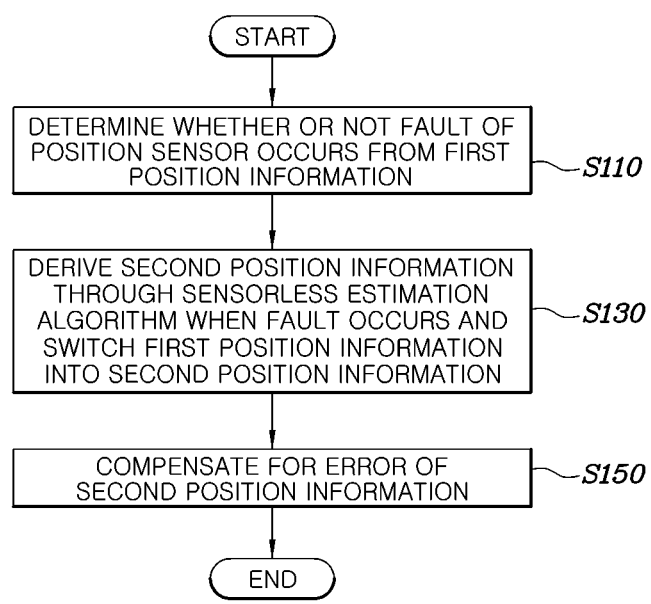
FIG. 2 is a flowchart of a method for controlling a motor for a vehicle according to a first exemplary embodiment of the present invention.
Figure 3:
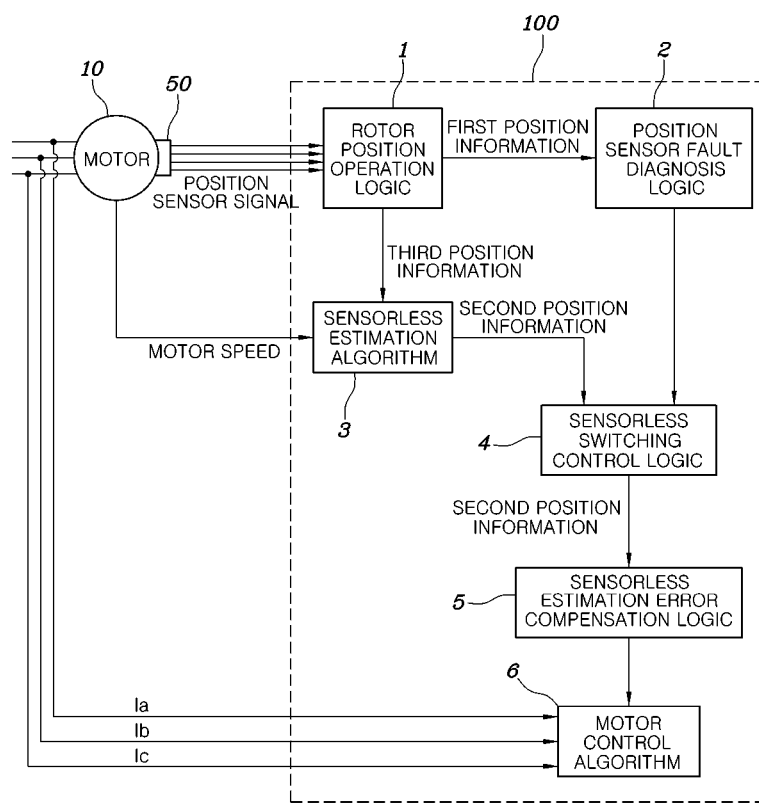
FIG. 3 is a control logic structure illustrating the method for controlling a motor for a vehicle according to an exemplary embodiment of the present invention.
Figure 4:
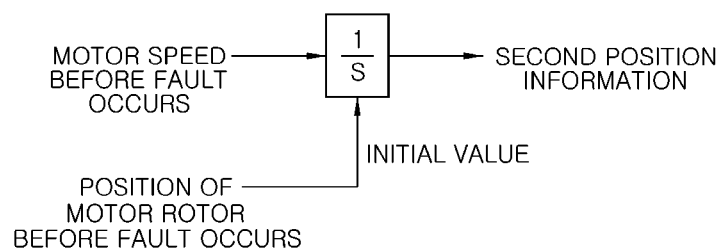
FIG. 4 is a diagram illustrating a switching operation of the method for controlling a motor for a vehicle according to the first exemplary embodiment of the present invention.
Figure 5:
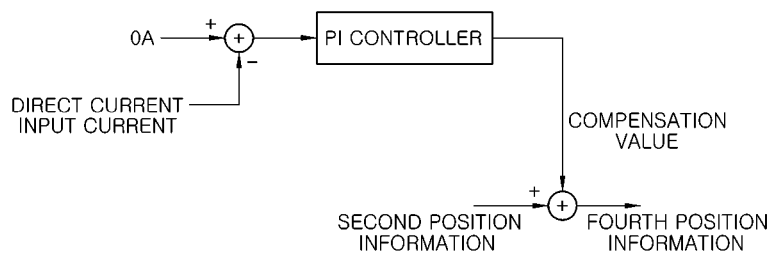
FIG. 5 is a diagram illustrating an error compensating operation of the method for controlling a motor for a vehicle according to an exemplary embodiment of the present invention.
Figure 6:
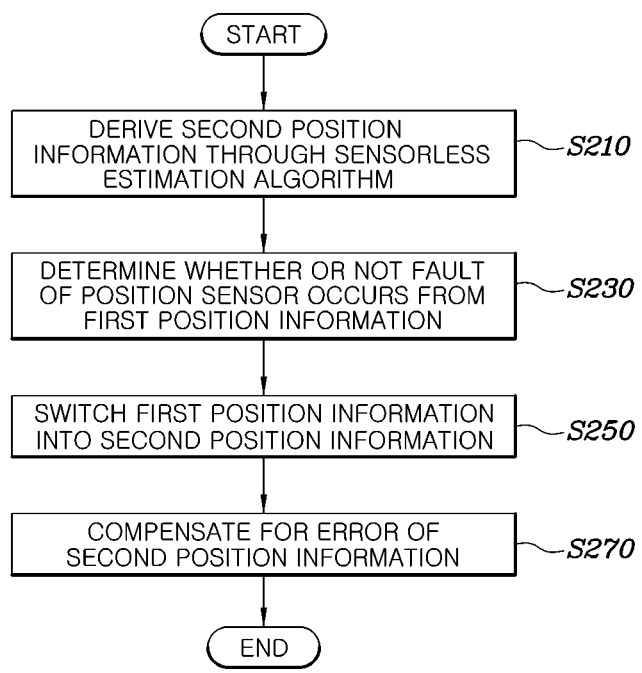
FIG. 6 is a flowchart of a method for controlling a motor for a vehicle according to a second exemplary embodiment of the present invention.

FIG. 1 is a configuration diagram of a system for controlling a motor for a vehicle according to an exemplary embodiment of the present invention, FIG. 2 is a flowchart of a method for controlling a motor for a vehicle according to a fust exemplary embodiment of the present invention, and FIG. 3 is a control logic structure illustrating the method for controlling a motor for a vehicle according to an exemplary embodiment of the present invention. FIG. 4 is a diagram illustrating a switching operation of the method for controlling a motor for a vehicle according to the first exemplary embodiment of the present invention, FIG. 5 is a diagram illustrating an error compensating operation of the method for controlling a motor for a vehicle according to an exemplary embodiment of the present invention, and FIG. 6 is a flowchart of a method for controlling a motor for a vehicle according to a second exemplary embodiment of the present invention.

Referring first to FIG. 1, a system for controlling a motor for a vehicle according to an exemplary embodiment of the present invention may include a motor 10 configured to generate driving force of the vehicle; a position sensor 50 of a motor rotor configured to output position information of a motor rotor 30; an inverter 70 configured to convert a direct current (DC) into an alternating current (AC) and output the AC to the motor 10; and a controller 100 configured to determine whether a fault of the position sensor 50 occurs by receiving first position information of the motor rotor 30 which is output from the position sensor 50 of the motor rotor, derive second position information using a sensorless estimation algorithm which is previously provided and stored in response to determining that the fault of the position sensor 50 occurs, switch the first position information into the second position information (e.g., replace the first position information with the second position information), sense or detect a value of the direct current which is input to the inverter 70 when output torque of the motor 10 is limited, compensate for error of the second position information based on the sensed value of the direct current.

A motor 10, which is a component configured to generate driving force of a vehicle, may include a stator and a rotor 30. A position sensor 50 may be a resolver according to an exemplary embodiment of the present invention and may be configured to output position information of the rotor. In particular, the resolver may include a total of six signal lines and when each of the signal lines is disconnected or shorted, the controller 100 that receives the position information may be configured to output an abnormal value. The inverter 70 may be configured to convert a high voltage direct current into a three-phase alternating current and apply the three-phase AC to the motor to thus adjust torque of the motor.

The controller 100 may be configured to determine whether a failure of the position sensor 50 occurs (e.g., detect a failure or malfunction of the position sensor) by receiving first position information of the motor rotor 30 which is output from the position sensor 50 of the motor rotor, derive second position information using a sensorless estimation algorithm which is previously provided and stored in response to detecting the failure of the position sensor 50, switch the first position information into the second position information, detect a value of the direct current which is input to the inverter 70 in the condition in which output torque of the motor 10 is limited, and compensate for error of the second position information based on the sensed value of the direct current.

A detailed control operation of the controller 100 will be described below with reference to a method for controlling a motor for a vehicle. Referring to FIGS. 2 and 3, a method for controlling a motor for a vehicle according to a first exemplary embodiment of the present invention may include determining whether a failure or malfunction of a position sensor occurs by receiving first position information of a motor rotor which is output from a position sensor of the motor rotor (S110); deriving second position information using a sensorless estimation algorithm which is previously provided and stored in response to determining that the failure of the position sensor occurs and switching the first position information into the second position information (S130); and sensing or detecting a value of a direct current which is input to an inverter when output torque of the motor is limited and compensating for error of the second position information based on the sensed value of the direct current (S150).

The determination of whether a failure of a position sensor occurs may include receiving the first position information of the motor rotor which is output from the position sensor of the motor rotor. In particular, the first position information refers to position information derived using a rotor position operation logic 1 which is previously provided and stored in the controller by receiving a position sensor signal which is output from the position sensor. Additionally, the determination of the failure may include determining whether an abnormal value is output by applying the first position information to a position sensor fault diagnosis logic 2 which is previously provided and stored.

In the switching of the first position information into the second position information in response to determining that the fault of the position sensor occurs, the sensorless estimation algorithm 3 may be used to derive and store the second position information. A sensorless switching control logic 4 may be provided with the second position information to replace the first position information with the second position information when it is determined that the failure of the position sensor occurs.

Referring to FIG. 4, the sensorless estimation algorithm 3 may derive the second position information by receiving third position information of the motor rotor and motor speed which are each output before the failure of the position sensor occurs and integrating the motor speed using the third position information of the motor rotor as an initial value.

In particular, it may be possible to obtain position information of the rotor which is not substantially deviated from an actual position of the rotor by deriving the second position information using the third position information and the motor speed which are output before the failure of the position sensor occurs. A value of the motor speed immediately before the failure of the position sensor occurs may be used for the sensorless estimation algorithm 3 since the motor speed is not changed substantially or is gradually changed in terms of a period (tens to hundreds μs) of a motor current control. When the second position information is derived, the first position information may be switched into the second position information, and as a result, the vehicle may be operated according to a driver's intention even when the failure of the position sensor occurs during driving of the vehicle.

In the compensating for error of the second position information, since the error between a parameter used in the algorithm and an actual physical value exists when the current control starts to be performed using the sensorless estimation algorithm 3, which may result in angle error, a value of the direct current which is input to the inverter when the output torque of the motor is limited may be sensed, and the error of the second position information may be compensated based on the sensed value of the direct current by a sensorless estimation error compensation logic 5.

Particularly, the condition in which the output torque of the motor is limited may be the condition in which the output torque of the motor is limited to zero (0) according to an exemplary embodiment of the present invention. When a sensorless estimated angle is equal to an actual position of the rotor, the value of the direct current which is input to the inverter needs to be zero when a zero torque control is performed. If the value of the direct current which is input to the inverter during the zero torque control is output in a positive direction, the sensorless estimated angle leads over an actual angle, and if the value of the direct current which is input to the inverter during the zero torque control is output in a negative direction, the sensorless estimated angle lags from the actual angle.

Referring to FIGS. 3 and 5, fourth position information, which is final position information, may be derived by sensing the value of the direct current which is input to the inverter in the condition in which the output torque of the motor is limited to zero, deriving a compensation value and compensating for the error of the second position information based on the sensed value of the direct current.

More specifically, when the output torque of the motor is limited to zero, the direct current which is input to the inverter may be compared with 0 A current. Then, an error between the direct current and 0 A current is input to a controller which generates the compensation value to reduce the error between the direct current and 0 A current. The controller may be implemented with a proportional integral (PI) controller, a proportional integral differential (PID) controller or the like 20 known in the art. The fourth position information may be derived by adding the compensation value to the second position information. The motor may then be operated by the controller by applying the derived fourth position information to a motor control algorithm 6.

Referring to FIG. 6, a method for controlling a motor for a vehicle according to a second exemplary embodiment of the present invention may include deriving second position information using a sensorless estimation algorithm 3 which is previously provided and stored (S210); determining whether a failure of a position sensor occurs by receiving first position information of a motor rotor which is output from a position sensor of the motor rotor (S230); switching the first position information into the second position information in response to determining that the failure of the position sensor occurs (S250); and sensing a value of a direct current which is input to an inverter in the condition in which output torque of the motor is limited and compensating for error of the second position information based on the sensed value of the direct current (S270).

In the deriving of second position information, which is an operation of deriving the second position information to which the first position information is switched when failure of the position sensor occurs, the position information of the motor rotor may be derived more accurately and stored by operating the sensorless estimation algorithm 3 when the position sensor of the rotor is normal (e.g., no failure) unlike the first exemplary embodiment.

In the determining of whether the fault occurs, since the failure is determined by receiving the first position information of the motor rotor which is output from the position sensor of the motor rotor in the same way as the first exemplary embodiment, a detailed description thereof will be omitted. In the switching of the first position information into the second position information, the first position information may be switched using the second position information which is previously derived and stored as it is, not in the integration way unlike the first exemplary embodiment. In the compensating for the error of the second position information, since the value of the direct current which is input to the inverter when the output torque of the motor is limited is sensed, and the error of the second position information is compensated based on the sensed value of the direct current in the same way as the first exemplary embodiment, a detailed description thereof will be omitted.

As described above, the method and the system for controlling a motor for a vehicle according to various exemplary embodiments of the present invention may continuously drive the vehicle, by operating the motor based on the position information of the rotor derived through the sensorless estimation algorithm in the event of fault of the position sensor of the motor rotor during driving of the vehicle.

Although the present invention is shown and described in connection with the specific exemplary embodiments, it is apparent to those skilled in the art that the modifications and variations can be made without departing from the spirit and scope of the invention as defined by the appended claims.

What is claimed is:

1. A method for controlling a motor for a vehicle, comprising:
    determining, by a controller, whether a failure of a position sensor occurs by receiving first position information of a motor rotor which is output from a position sensor of the motor rotor;
    deriving, by the controller, second position information using a sensorless estimation algorithm in response to determining that the failure of the position sensor occurs and switching the first position information into the second position information, wherein the sensorless estimation algorithm is previously provided and stored; and
    detecting, by the controller, a value of a direct current which is input to an inverter in the condition in which output torque of the motor is limited and compensating for error of the second position information based on the sensed value of the direct current,
    wherein in the switching of the first position information into the second position information, the second position information is derived by applying third position information of the motor rotor and motor speed which are each output before the failure of the position sensor occurs to the sensorless estimation algorithm, and
    wherein the sensorless estimation algorithm derives the second position information using the third position information as an initial value and integrating the motor speed.

2. The method of claim 1, wherein in the compensating of the error of the second position information, the value of the direct current which is input to the inverter is sensed in the condition in which the output torque of the motor is limited to zero (0), and a compensation value is derived based on the sensed value of the direct current.

3. A system for controlling a motor for a vehicle, comprising:
    a motor configured to generate driving force of the vehicle;
    a position sensor of a motor rotor configured to output position information of the motor rotor;
    an inverter configured to convert a direct current into an alternating current and output the alternating current to the motor; and
    a controller configured to:
        determine whether a failure of the position sensor occurs by receiving first position information of the motor rotor which is output from the position sensor of the motor rotor;
        derive second position information using a sensorless estimation algorithm in response to determining that the failure of the position sensor occurs, wherein the sensorless estimation algorithm is previously provided and stored;
        switch the first position information into the second position information;
        sense a value of the direct current which is input to the inverter in the condition in which output torque of the motor is limited; and
        compensate for error of the second position information based on the sensed value of the direct current,
    wherein the controller is configured to derive the second position information by applying third position information of the motor rotor and motor speed which are each output before the failure of the position sensor occurs to the sensorless estimation algorithm, and wherein the sensorless estimation algorithm derives the second position information using the third position information as an initial value and integrating the motor speed.

4. The system of claim 3, wherein the controller is configured to sense the value of the direct current which is input to the inverter in the condition in which the output torque of the motor is limited to zero (0), and compensate for error of the second position information based on the sensed value of the direct current.

* * * * *